US010827531B2

(12) United States Patent
Tsodik et al.

(10) Patent No.: US 10,827,531 B2
(45) Date of Patent: Nov. 3, 2020

(54) RANDOM ACCESS MECHANISM FOR ACCESS POINT AND STATION IN A WIRELESS COMMUNICATION NETWORK

(71) Applicant: Huawei Technologies Co., Ltd., Shenzhen, Guangdong (CN)

(72) Inventors: Genadiy Tsodik, Munich (DE); Shimon Shilo, Munich (DE); Doron Ezri, Munich (DE); Avi Weitzman, Munich (DE); Jiayin Zhang, Ottawa (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 2 days.

(21) Appl. No.: 16/125,247

(22) Filed: Sep. 7, 2018

(65) Prior Publication Data
US 2019/0007978 A1 Jan. 3, 2019

Related U.S. Application Data

(63) Continuation of application No. PCT/EP2016/054946, filed on Mar. 8, 2016.

(51) Int. Cl.
*H04W 74/08* (2009.01)
*H04W 74/00* (2009.01)
(Continued)

(52) U.S. Cl.
CPC ....... *H04W 74/0833* (2013.01); *H04W 8/005* (2013.01); *H04W 48/04* (2013.01);
(Continued)

(58) Field of Classification Search
CPC .......... H04W 74/0833; H04W 74/006; H04W 48/04; H04W 8/005; H04W 76/11; H04W 72/0406; H04W 72/0446
See application file for complete search history.

(56) References Cited

U.S. PATENT DOCUMENTS

2011/0244907 A1* 10/2011 Golaup .................. H04W 4/70
455/509
2017/0013443 A1* 1/2017 Gopalakrishnan .... H04W 8/186

FOREIGN PATENT DOCUMENTS

EP 2373110 A2 10/2011

OTHER PUBLICATIONS

"IEEE Standard for Information technology—Telecommunications and information exchange between systems Local and metropolitan area networks—Specific requirements, Part 11: Wireless LAN Medium Access Control (MAC) and Physical Layer (PHY) Specifications", IEEE Std 802.11-2012, Mar. 29, 2012, 2793 pages, XP017694963.

* cited by examiner

*Primary Examiner* — Jackie Zuniga Abad
(74) *Attorney, Agent, or Firm* — Womble Bond Dickinson (US) LLP (57) ABSTRACT

The application relates to an access point type communication device (110) configured to allocate a plurality of random access resources to a set of associated client type communication devices (120a-c). The access point type communication device (110) comprises a controller (111) configured to maintain a set of association identifiers, wherein each identifier of the set of association identifiers is configured to identify a respective client type communication device of the set of client type communication devices (120a-c), as well as a set of random access identifiers. In an embodiment, the access point type communication device (110) further comprises an allocator (113) configured to allocate the plurality of random access resources to the set of client type communication devices (120a-c) on the basis of the set of random access identifiers.

16 Claims, 7 Drawing Sheets

600

```
Maintaining a first set of association identifiers, wherein each identifier of
the first set of association identifiers is configured to identify a respective       601
associated client type communication device of a set of associated client
type communication devices, and a second set of random access identifiers
```

```
Allocating the plurality of random access resources to the set of associated         603
client type communication devices on the basis of the second set of random
access identifiers
```

(51) Int. Cl.
*H04W 76/11* (2018.01)
*H04W 8/00* (2009.01)
*H04W 48/04* (2009.01)
*H04W 72/04* (2009.01)

(52) U.S. Cl.
CPC .......... *H04W 74/006* (2013.01); *H04W 76/11* (2018.02); *H04W 72/0406* (2013.01); *H04W 72/0446* (2013.01)

|   | 1 | 2 | 3 | 4 | 5 | 6 | 7 | 8 | 9 | 10 |
|---|---|---|---|---|---|---|---|---|---|----|
| a | 1 | 2 | 3 | 4 | 5 | 6 | 7 | 8 | 9 | 10 |
| b | 1 | 2 | 3 | 4 | 5 |   | 7 | 8 | 9 | 10 |
| c | 1 | 2 | 3 | 4 | 5 | 6 | 7 | 8 |   | 10 |
| d | 1 | 2 | 3 | 4 | 5 | 6 | 7 | 8 | 9 |    |

RANDOM ACCESS MECHANISM FOR ACCESS POINT AND STATION IN A WIRELESS COMMUNICATION NETWORK

CROSS-REFERENCE TO RELATED APPLICATIONS

This application is a continuation of International Application No. PCT/EP2016/054946, filed on Mar. 8, 2016, the disclosure of which is hereby incorporated by reference in its entirety.

TECHNICAL FIELD

In general, the present application relates to the field of wireless communications. More specifically, the present application relates to an access point type communication device and a client type communication device as well as corresponding methods implementing a random access mechanism in a wireless communication network.

BACKGROUND

Random access (RA) is a procedure that allows client type communication devices, such as stations (STA) in accordance with the 802.11 family of standards, to request by means of a resource request transmission resources from an access point type communication device or short access point (AP). In other words, this mechanism is usually applied by the associated client type communication devices that need to request uplink resources for transmitting data to other communication devices connected to the access point type communication device.

The number of client type communication devices, which include more and more special devices, like Internet of Things (IoT) clients, grows and is expected to reach very high numbers. Thus, an effective RA mechanism, which can efficiently handle a large number of clients, is crucial for future generations of communication systems, especially for future generations of the 802.11 protocol.

Currently, in the 802.11ax standard, RA is applied immediately after a trigger frame (TF), which is transmitted by the AP. Thus, the client type communication devices wait for AP to trigger them by indicating the existence of a random access opportunity. A TF may be followed by several RA opportunities—within each opportunity, clients can try to access the channel. For doing so they contend with each other. Two main trends in this respect are MAC based RA and PHY based RA.

In MAC based RA, the RA is transmitted as regular data, including payload, where each client allocates its transmission within a single resource unit (RU) as defined in 802.11ax. A RU is defined as a set of continuous subcarriers, e.g. 26 subcarriers, over some period of time. The AP can decide to provide more than one RA frame triggered by a single TF. The specific frame and the RU within the frame can be chosen in a random way by each client type communication device. No distinguishing between the non-associated client type communication devices and associated client type communication devices is introduced and all the client type communication devices that try to transmit an RA, are allowed to choose any time/frequency resources allocated for the current RA opportunity.

The main disadvantage of a MAC based RA is the very low number of RA resources available within a single frame. For instance, in a frequency band having a bandwidth of 20 MHz there are 9 RUs available. When the number of client type communication devices is high, the probability of two or more clients choosing the same time and frequency resources to transmit their RA data is very high. This leads to a large number of collisions which requires RA retransmissions. As a result, the total time required to complete the RA procedure for all the client type communication devices, which try to transmit, can be extremely long. Moreover, any new client type communication devices, which are not yet associated with the AP and are trying to access the network, can interfere with the already associated client type communication devices. This leads to a further reduction in system efficiency. It is important to note that generally the AP has no information about how many non-associated client type communication devices there are and which of these will try to associate with it. Since these numbers may be large, the collision probability may be very high.

In PHY based RA, the RA is transmitted as PHY signaling and does not include any higher layer (MAC or above) payload. There are several proposals for PHY based RA, where the RA data is a simple PHY signaling that informs the AP that a specific client type communication device requires resources. Thus, the RA data can be very short and allows a higher number of client type communication devices to be allocated within a single RA frame. These proposals assume a one-to-one mapping between each client type communication device assigned to transmit and the available resources. This type of mapping can ensure that (i) there are no collisions between different client type communication devices, and (ii) all the transmitted signals are orthogonal.

Generally, this mapping is based on an identifier, such as an Association Identifier (AID) or a Partial AID (PAID), which allows the AP to uniquely identify a client type communication device. When the number of client type communication devices is high their identifier can be uniformly distributed in a range of available ID numbers. In this case defining a single mapping formula can be a very complex problem. In such scenarios the one-to-one mapping can be indicated only by direct signaling per each allocated client type communication device resulting in a substantial signaling overhead.

In light of the above, there is a need for improved devices and methods for implementing a Random Access mechanism in a wireless communication network, in particular a wireless communication network in accordance with at least one of the standards of the 802.11 protocol family.

SUMMARY

It is an object of the application to provide for improved devices and methods for implementing a random access mechanism in a wireless communication network, in particular a wireless communication network in accordance with the 802.11 protocol family.

The foregoing and other objects are achieved by the subject matter of the independent claims. Further implementation forms are apparent from the dependent claims, the description and the figures.

The devices and methods described herein may be applied in 802.11ax communication systems. In 802.11ax standard development, the random access (RA) mechanism can be applied immediately after a trigger frame (TF) that is transmitted by the access point (AP), also referred hereinafter as "access point type communication device". Thus the stations (STAs), also referred hereinafter as "client type communication devices", wait for the AP to trigger them. A TF may be followed by one or more uplink (UL) frames, where each frame comprises a RA signal transmitted by one or more STAs.

The devices and methods described herein may be configured to transmit and/or receive radio signals. Radio signals may be or may include radio frequency signals radiated by a radio transmitting device (or radio transmitter or sender) with a radio carrier frequency lying in a range of about 3 Hz to 300 GHz. The frequency range may correspond to frequencies of alternating current electrical signals used to produce and detect radio waves.

The devices and methods described herein may be applied in OFDM and OFDMA systems. OFDM and OFDMA are schemes for encoding digital data on multiple carrier frequencies. A large number of closely spaced orthogonal sub-carrier signals may be used to carry data. Due to the orthogonality of the sub-carriers crosstalk between sub-carriers may be suppressed.

In order to describe the application in detail, the following terms, abbreviations and notations will be used:
  STA: Station, also referred to as client type communication device
  AP: Access Point, also referred to as access point type communication device
  OFDM: Orthogonal Frequency Division Multiplexing
  OFDMA: Orthogonal Frequency Division Multiple Access
  TF: Trigger Frame
  RA: Random Access
  AID: Association Identifier
  RAID: Random Access Identifier
  UL: Uplink
  DL: Downlink
  PHY: Physical layer (device)

The application is based on the idea to provide in addition to a set or list of association identifiers (AIDs), which can be assigned to a respective client type communication device during its association procedure, a set or list of random access identifiers (RAIDs) in an access point type communication device. Whereas the association identifiers are fixed or static, the random access identifiers can be dynamic in the sense that these can be reassigned. This allows that all RAIDs will be, for instance, a sequence of consecutive integer numbers. Thus, for informing client type communication devices about the allocation of random access resources it is sufficient for the access point type communication device to provide the client type communication devices, for instance, in the context of a trigger frame with the first number of the sequence of consecutive integer numbers, i.e., the first random access identifier, and the size of the sequence of consecutive integer numbers or the number of random access identifiers assigned to a current RA frame. On the basis of this information and its assigned random access identifier any client type communication device can determine its allocated random access resource(s).

Thus, according to a first aspect the application relates to an access point type communication device configured to allocate a plurality of random access resources for communicating with the access point type communication device to a set of associated client type communication devices. The access point type communication device comprises a controller configured to maintain a first set of association identifiers, wherein each identifier of the first set of association identifiers is configured to identify a respective associated client type communication device of the set of associated client type communication devices, and a second set of random access identifiers.

Thus, an access point type communication device is provided implementing an improved Random Access mechanism in a wireless communication network, in particular a wireless communication network in accordance with at least one of the standards of the 802.11 protocol family.

In a first possible implementation form of the access point type communication device according to the first aspect of the application, the access point type communication device further comprises an allocator configured to allocate the plurality of random access resources to the set of associated client type communication devices on the basis of the second set of random access identifiers.

In a second possible implementation form of the access point type communication device according to the first aspect as such or the first implementation form thereof, the controller is configured to assign each random access identifier of the set of random access identifiers to a respective association identifier of the set of association identifiers, i.e. to a respective associated client type communication device of the set of associated client type communication devices.

In a third possible implementation form of the access point type communication device according to the second implementation form of the first aspect, the controller is configured to assign each random access identifier of the set of random access identifiers to a respective association identifier of the set of association identifiers during an association session of the respective client type communication device.

In a fourth possible implementation form of the access point type communication device according to the second or third implementation form of the first aspect, the controller is configured to reassign, i.e., update, at least some of the random access identifiers of the set of random access identifiers to a respective association identifier of the set of association identifiers in response to a change of an association state of at least one of the client type communication devices of the set of client type communication devices. A change of an association state of at least one of the client type communication devices can be, for instance, that a client type communication device is no longer associated with the access point type communication device or a client type communication device switches to a sleep mode.

In a fifth possible implementation form of the access point type communication device according to any one of the first to fourth implementation form of the first aspect, the access point type communication device further comprises a transceiver configured to transmit to each associated client type communication device of the set of associated client type communication devices the respective random access identifier of the set of random access identifiers. This can be done as part of a scheduled transmission or pushed by the access point type communication device.

In a sixth possible implementation form of the access point type communication device according to the first aspect as such or any one of the first to fifth implementation form thereof, the access point type communication device further comprises a transceiver configured to transmit to each client type communication device of the set of client type communication devices information about the allocation of the plurality of random access resources to the set of associated client type communication devices based on the set of random access identifiers.

In a seventh possible implementation form of the access point type communication device according to the fifth or sixth implementation form of the first aspect, the set of random access identifiers is a sequence of integers, wherein the transceiver is configured to transmit to each associated client type communication device of the set of associated client type communication devices the information about the allocation of the plurality of random access resources to the set of associated client type communication devices based on the set of random access identifiers by transmitting the first element and the size of the sequence of integers or the number of random access identifiers assigned, for instance, to a current random access frame.

In an eighth possible implementation form of the access point type communication device according to the sixth or seventh implementation form of the first aspect, the transceiver is configured to transmit to each associated client type communication device of the set of associated client type communication devices the information about the allocation of the plurality of random access resources to the set of associated client type communication devices based on the set of random access identifiers as part of a trigger frame.

In a further possible implementation form of the access point type communication device according to the first aspect as such or any one of the first to eighth implementation form thereof, the plurality of random access resources are defined by a random access frame.

According to a second aspect the application relates to a client type communication device configured to communicate with an access point type communication device, wherein the client type communication device comprises a transceiver configured to receive from the access point type communication device a random access identifier assigned to the client type communication device, and a controller configured to determine on the basis of the random access identifier at least one random access resource of a plurality of random access resources for communicating with the access point type communication device.

According to a third aspect the application relates to a communication frame for communication between an access point type communication device and a set of client type communication devices, wherein the communication frame comprises information about the allocation of a plurality of random access resources to the set of client type communication devices based on a set of random access identifiers being maintained by the access point type communication device.

The communication frame may be implemented in accordance with an OFDMA technology, in particular in accordance with a WiFi 802.11ax standard.

In a first possible implementation form of the communication frame according to the third aspect as such, the communication frame is a trigger frame.

According to a fourth aspect the application relates to a method of operating an access point type communication device configured to allocate a plurality of random access resources for communicating with the access point type communication device to a set of associated client type communication devices, wherein the method comprises the steps of: maintaining a first set of association identifiers, wherein each identifier of the first set of association identifiers is configured to identify a respective associated client type communication device of the set of associated client type communication devices, and a second set of random access identifiers.

In a possible implementation form of the method according to the fourth aspect of the application, the method comprises the further step of allocating the plurality of random access resources to the set of associated client type communication devices on the basis of the second set of random access identifiers.

The method according to the fourth aspect of the application can be performed by the access point type communication device according to the first aspect of the application. Further features of the method according to the fourth aspect of the application result directly from the functionality of the access point type communication device according to the first aspect of the application and its different implementation forms.

According to a fifth aspect the application relates to a method of operating a client type communication device configured to communicate with an access point type communication device, wherein the method comprises: receiving from the access point type communication device a random access identifier assigned to the client type communication device; and determining on the basis of the random access identifier at least one random access resource of a plurality of random access resources for communicating with the access point type communication device.

The method according to the fifth aspect of the application can be performed by the client type communication device according to the second aspect of the application. Further features of the method according to the fifth aspect of the application result directly from the functionality of the client type communication device according to the second aspect of the application and its different implementation forms.

According to a sixth aspect the application relates to a computer program comprising program code for performing the method according to the fourth aspect or the fifth aspect of the application when executed on a computer.

The application can be implemented in hardware and/or software.

BRIEF DESCRIPTION OF THE DRAWINGS

Further embodiments of the application will be described with respect to the following figures, wherein.

DETAILED DESCRIPTION OF THE EMBODIMENTS

In the various figures, identical reference signs will be used for identical or at least functionally equivalent features.

In the following description, reference is made to the accompanying drawings, which form part of the disclosure, and in which are shown, by way of illustration, specific aspects in which the present application may be placed. It will be appreciated that other aspects may be utilized and structural or logical changes may be made without departing from the scope of the present application. The following detailed description, therefore, is not to be taken in a limiting sense, as the scope of the present application is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Generally, it has to be noted that all arrangements, devices, elements, units and means and so forth described in the present application could be implemented by software or hardware elements or any kind of combination thereof. Furthermore, the devices may be processors or may comprise processors, wherein the functions of the elements, units and means described in the present applications may be implemented in one or more processors. All steps which are performed by the various entities described in the present application as well as the functionality described to be performed by the various entities are intended to mean that the respective entity is adapted to or configured to perform the respective steps and functionalities. Even if in the following description or specific embodiments, a specific functionality or step to be performed by a general entity is not reflected in the description of a specific detailed element of that entity which performs that specific step or functionality, it should be clear for a skilled person that these methods and functionalities can be implemented in respect of software or hardware elements, or any kind of combination thereof.

Moreover, in the following detailed description as well as in the claims embodiments with different functional blocks or processing units are described, which are connected with each other or exchange signals. It will be appreciated that the present application covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

Figure 1:
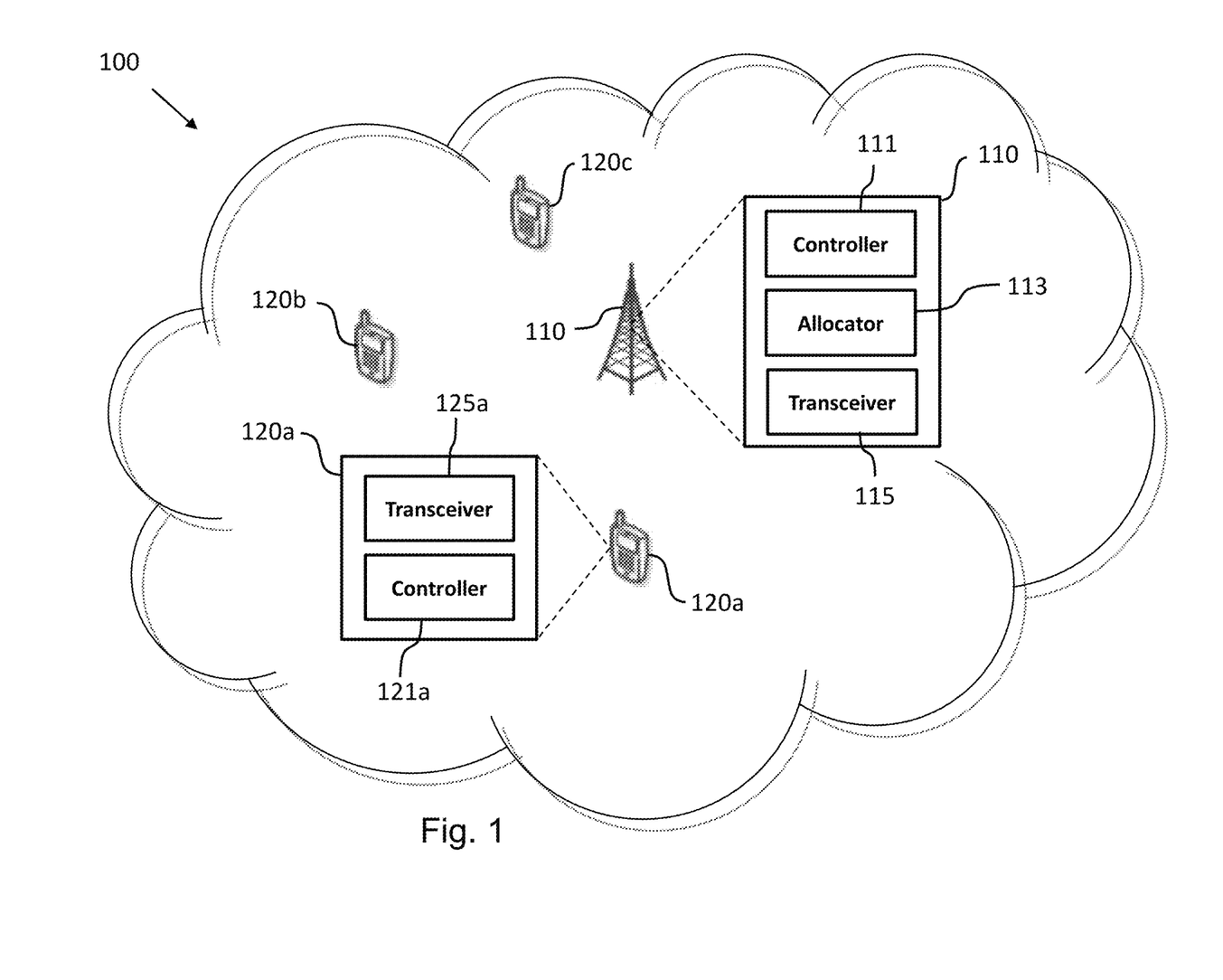
FIG. 1 shows a schematic diagram illustrating an exemplary wireless communication system with an access point type communication device according to an embodiment and three client type communication devices according to an embodiment.

FIG. 1 shows a schematic diagram of an exemplary wireless communication system 100 comprising an access point (AP) type communication device (or "access point") 110 according to an embodiment and by way of example three client type communication devices (or short "stations") 120a-c according to an embodiment. Each client type communication device 120a-c can be a WiFi station (e.g. according to 802.11ax) and the AP type communication device 110 can be an access point, in particular a WiFi AP or hot spot. Each client type communication device 120a-c and the AP type communication device 110 may be coupled by a communication channel for an exchange of communication frames, such as trigger frames, random access frames, association frames and the like.

The client type communication devices 120a-c can constitute a set of associated client type communication devices 120a-c and the AP type communication device 110 is configured to allocate a plurality of random access resources for communicating with the AP type communication device 110 to the set of associated client type communication devices 120a-c.

The AP type communication device 110 comprises a controller 111 configured to maintain a first set of association identifiers, wherein each identifier of the first set of association identifiers is configured to identify a respective associated client type communication device of the set of associated client type communication devices 120a-c, and a second set of random access identifiers. As will be described in more detail further below, the association identifiers are fixed or static for providing a unique identification of a client type communication device, whereas the random access identifiers can be dynamic in the sense that these can be reassigned.

In an embodiment, the AP type communication device 110 comprises an allocator 113 configured to allocate the plurality of random access resources to the set of associated client type communication devices 120a-c on the basis of the second set of random access identifiers.

Each client type communication device 120a-c comprises a transceiver 125a configured to receive from the AP type communication device 110 a random access identifier assigned to the respective client type communication device 120a-c and a controller 121a configured to determine on the basis of the random access identifier at least one random access resource of a plurality of random access resources for communicating with the AP type communication device 110.

Figure 2:
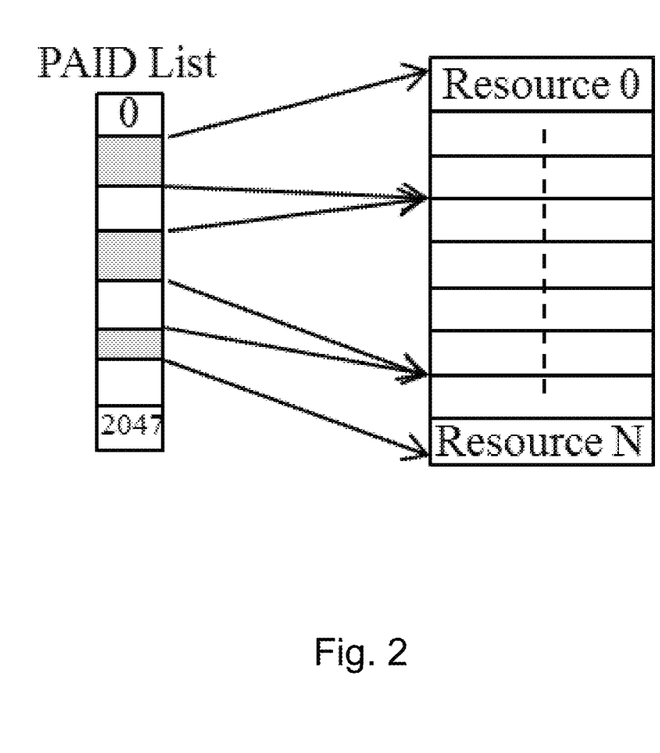
FIG. 2 shows a schematic diagram illustrating an exemplary mapping of association identifiers to random access resources.

FIG. 2 shows a schematic diagram illustrating an exemplary mapping of association identifiers to random access resources, which could occur in a conventional access point type communication device. When the number of client type communication devices is high, their respective association identifiers or partial association identifiers (PAIDs), for instance integer numbers represented by 11 bits, can be distributed over the whole range of available association identifiers (in the exemplary scenario shown in FIG. 2 from 0 to 2047). In this case, defining a single mapping formula is generally a very complex problem so that in this case a one-to-one mapping can be indicated only by direct signalling per each allocated client type communication device, which leads to a substantial signaling overhead.

Figure 3:
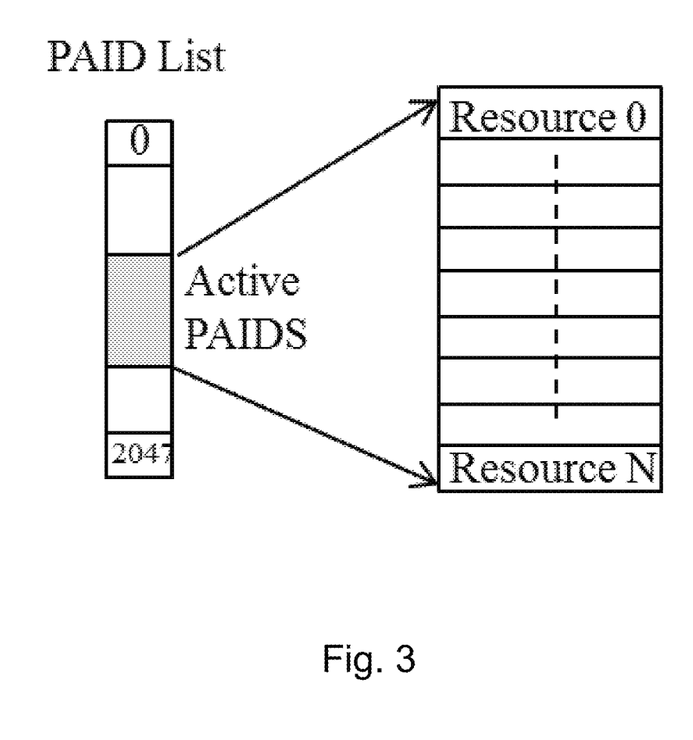
FIG. 3 shows a schematic diagram illustrating an exemplary mapping of association identifiers to random access resources.
Figure 4:
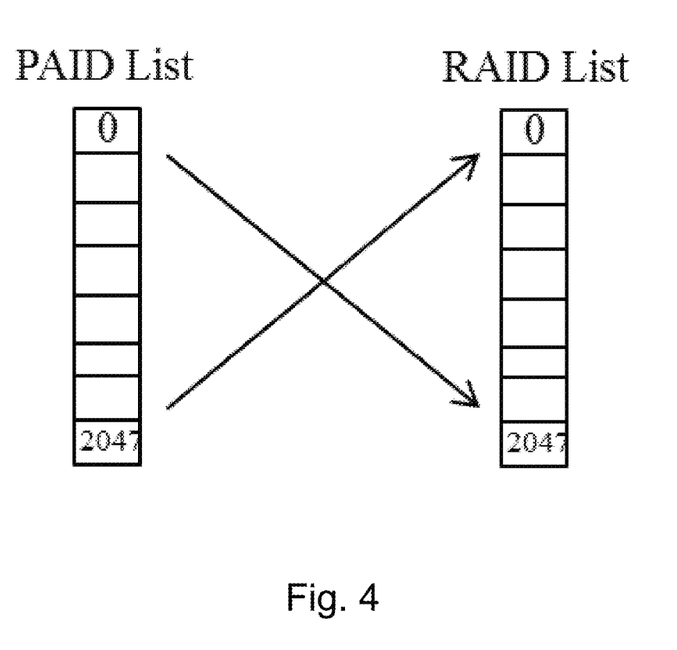
FIG. 4 shows a schematic diagram illustrating an exemplary mapping of association identifiers to random access identifiers as implemented in an access type communication device according to an embodiment.

FIGS. 3 and 4 show schematic diagrams illustrating ideas implemented in embodiments of the application. The exemplary mapping of partial association identifiers (PAIDs) to random access resources shown in FIG. 3 would allow reducing the signaling overhead in comparison to the mapping shown in FIG. 2. To this end, as already described above, embodiments of the present application provide in addition to the set or list of AIDs or PAIDs a list or set of random access identifiers. FIG. 4 shows a schematic diagram illustrating an exemplary mapping of association identifiers to random access identifiers as implemented in the wireless communication system 100.

In an embodiment, the random access resources can be defined by a random access frame. In an embodiment, the plurality of random access resources can be a plurality of random access blocks as defined in the standard 802.11ax. A random access block typically comprises a plurality of frequency subcarriers and a plurality of time slots. A frequency section comprises at least one such frequency subcarrier but typically a plurality of neighboring (the spacing between two neighboring frequency subcarriers depends on what is defined by the underlying communication system) frequency subcarriers.

In an embodiment, the controller 111 of the AP type communication device 110 is configured to assign each random access identifier of the set of random access identifiers to a respective association identifier of the set of association identifiers, i.e., to a respective associated client type communication device of the set of associated client type communication devices 120a-c.

In an embodiment, the controller 111 of the AP type communication device 110 is configured to assign each random access identifier of the set of random access identifiers to a respective association identifier of the set of association identifiers during an association session of the respective client type communication device 120a-c. In an embodiment, initially for at least some of the associated client type communication devices 120a-c the random access identifier can be equal to the association identifier.

Figure 5:
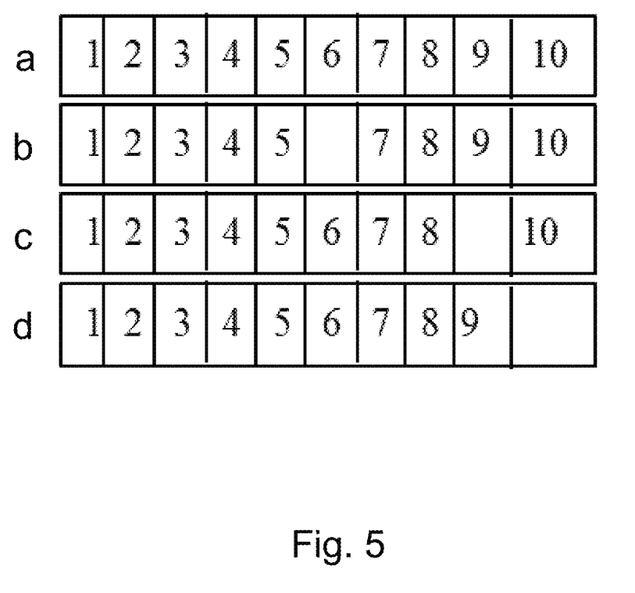
FIG. 5 shows a schematic diagram illustrating an exemplary reassignment procedure of random access identifiers as implemented in an access type communication device according to an embodiment.

FIG. 5 shows an exemplary scenario where ten client type communication devices 120a-c are associated with the AP type communication device 110. An exemplary list of RAIDs is shown by the row "a" in FIG. 5. If the client type communication device assigned to RAID #6 leaves the wireless communication network 100, for instance because it roams away or is turned off, the list of active RAIDs can be as shown by the row "b" in FIG. 5. In the next frame the AP type communication device 110 communicates with the client type communication device assigned to RAID #9. In this exemplary scenario, the AP type communication device 110 now reassigns this client type communication device to RAID #6 resulting in the new list of RAIDs shown by the row "c" in FIG. 5. In the next frame the AP type communication device 110 communicates with the client type communication device assigned to RAID #10 and reassigns this client type communication device to RAID #9, as shown by the row "d" in FIG. 5. Thus, the RAIDs have been reassigned so that the list of RAIDs is consecutive again.

Thus, in an embodiment, the controller 111 of the AP type communication device 110 is configured to reassign, i.e., update at least some of the random access identifiers of the set of random access identifiers to a respective association identifier of the set of association identifiers in response to a change of an association state of at least one of the client type communication devices 120a-c of the set of associated client type communication devices 120a-c.

In an embodiment, the AP type communication device 110 further comprises a transceiver 115 configured to transmit to each associated client type communication device of the set of associated client type communication devices 120a-c the respective random access identifier of the set of random access identifiers. In an embodiment, the AP type communication device 110 is configured to provide this information as part of a scheduled transmission. In an embodiment, this information can be provided on the basis of a push mechanism implemented in the AP type communication device 110.

In an embodiment, the transceiver 115 of the AP type communication device 110 can be configured to transmit to each associated client type communication device of the set of associated client type communication devices 120a-c information about the allocation of the plurality of random access resources to the set of associated client type communication devices based on the set of random access identifiers.

In an embodiment, the set of random access identifiers is a (consecutive) sequence of integers and the transceiver 115 of the AP type communication device 110 is configured to transmit to each associated client type communication device of the set of associated client type communication devices 120a-c the information about the allocation of the plurality of random access resources to the set of associated client type communication devices 120a-c based on the set of random access identifiers by transmitting the first element and the size of the sequence of integers or the number of random access identifiers assigned, for instance, to a current random access frame. On the basis of this information and its assigned random access identifier any client type communication device 120a-c can determine its allocated random access resource(s). In an embodiment, this information can be provided by the AP type communication device 110 as part of a trigger frame.

Figure 6:
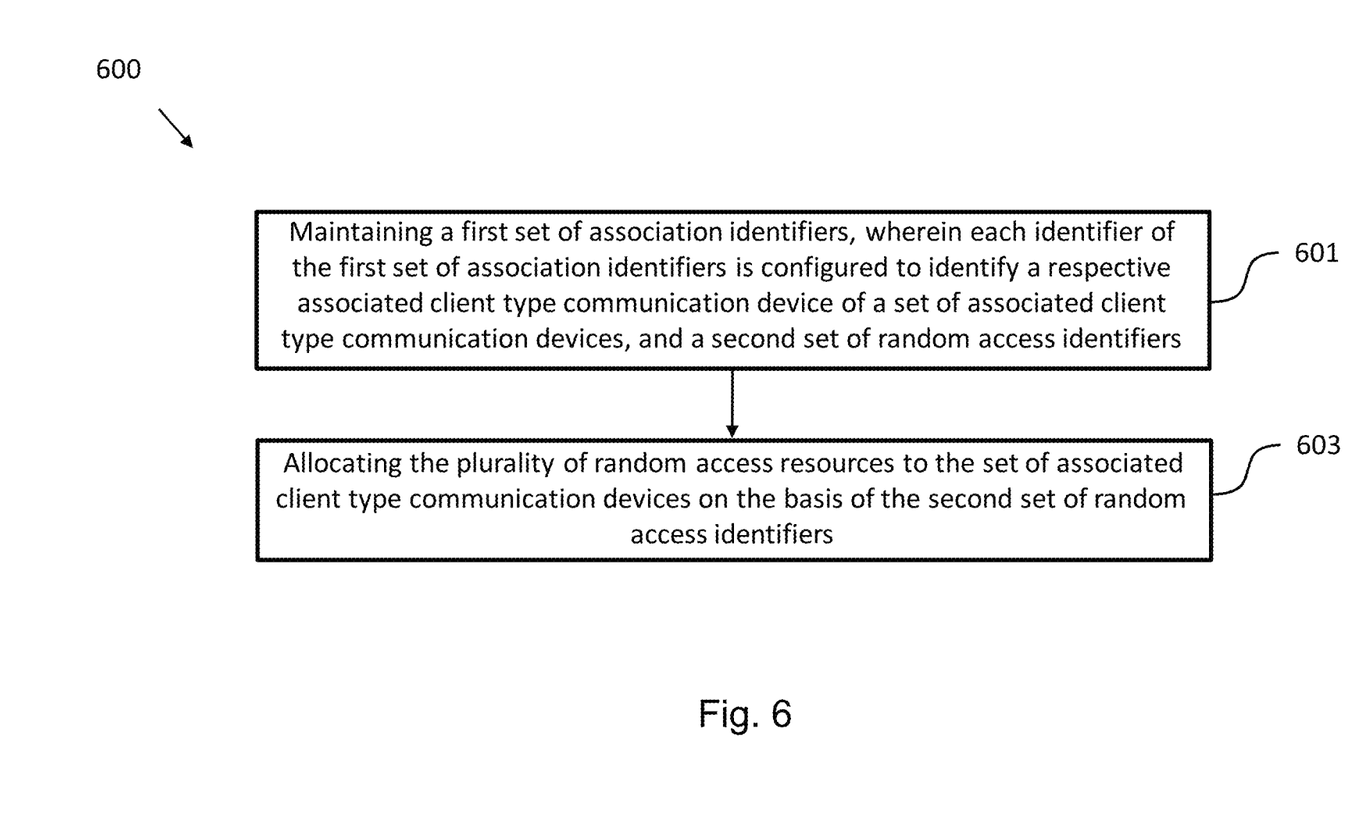
FIG. 6 shows a schematic diagram illustrating a method of operating an access point type communication device according to an embodiment.

FIG. 6 shows a schematic diagram illustrating a method 600 of operating the AP type communication device 110 according to an embodiment. The method 600 comprises a first step 601 of maintaining a first set of association identifiers, wherein each identifier of the first set of association identifiers is configured to identify a respective associated client type communication device of the set of associated client type communication devices 120a-c, and a second set of random access identifiers. In an embodiment, the method 600 comprises a further step 603 of allocating the plurality of random access resources to the set of associated client type communication devices 120a-c on the basis of the second set of random access identifiers.

Figure 7:
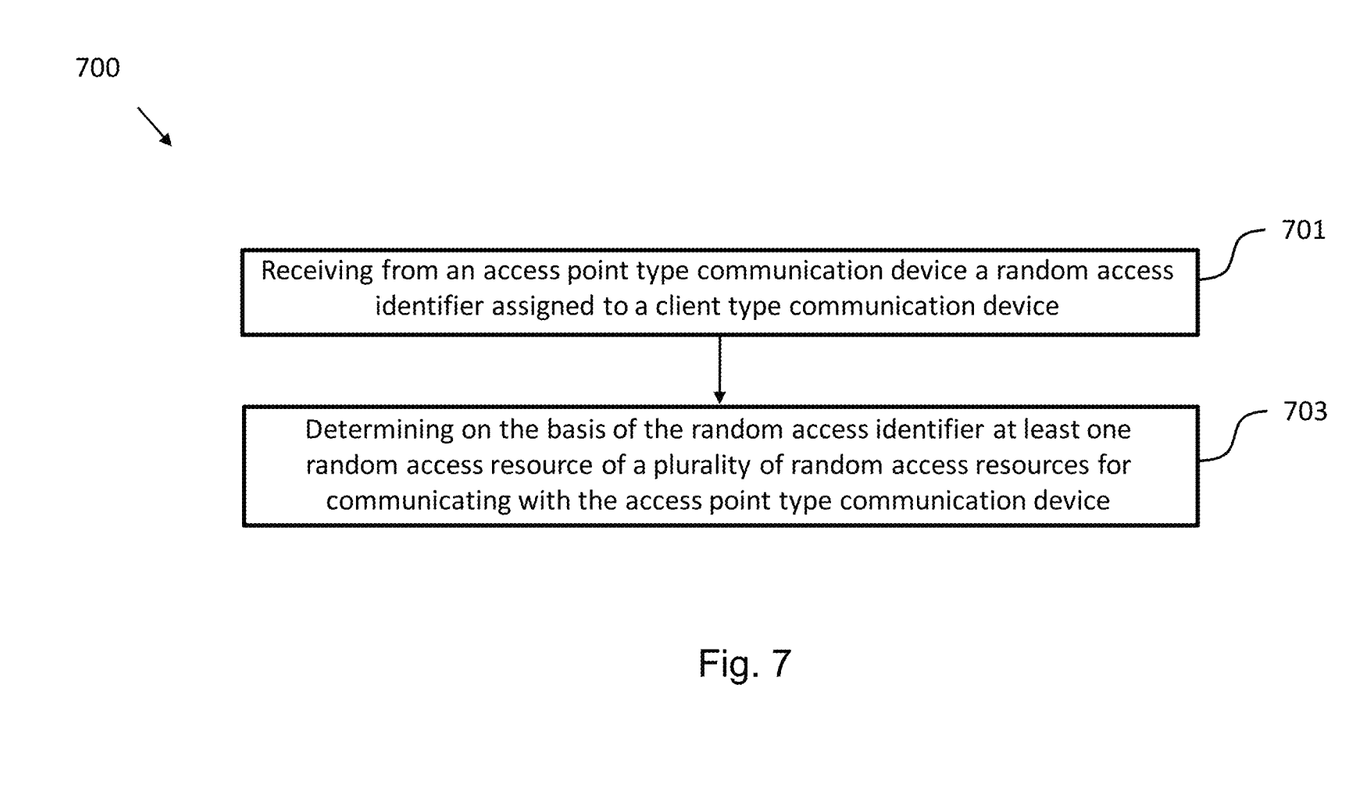
FIG. 7 shows a schematic diagram illustrating a method of operating a client type communication device according to an embodiment.

FIG. 7 shows a schematic diagram illustrating a method 700 of operating the client type communication device 120a according to an embodiment. The method 700 comprises a first step 701 of receiving from the AP type communication device 110 a random access identifier assigned to the client type communication device. The method 700 comprises a further step 703 of determining on the basis of the random access identifier at least one random access resource of a plurality of random access resources for communicating with the AP type communication device 110.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the application beyond those described herein. While the present application has been described with reference to one or more particular embodiments, those skilled in the art recognize that many changes may be made thereto without departing from the scope of the present application. It is therefore to be understood that within the scope of the appended claims and their equivalents, the application may be practiced otherwise than as specifically described herein.

What is claimed is:

1. An access point type communication device configured to allocate a plurality of random access resources to a set of client type communication devices, the access point type communication device comprising:
a controller configured to maintain a set of association identifiers, wherein each identifier of the set of association identifiers is configured to identify a respective client type communication device of the set of client type communication devices, and a set of random access identifiers, to assign each random access identifier of the set of random access identifiers to a respective association identifier of the set of association identifiers, and to reassign at least some of the random access identifiers of the set of random access identifiers to a respective association identifier of the set of association identifiers in response to a charge of an association state of at least one of the client type communication devices of the set of client type communication devices.

2. The access point type communication device of claim 1, further comprising:
an allocator configured to allocate the plurality of random access resources to the set of client type communication devices on the basis of the set of random access identifiers.

3. The access point type communication device of claim 1, wherein the controller is configured to assign each random access identifier of the set of random access identifiers to a respective association identifier of the set of association identifiers during an association session of the respective client type communication device.

4. The access point type communication device of claim 1, further comprising:
a transceiver configured to transmit to each client type communication device of the set of client type communication devices the respective random access identifier of the set of random access identifiers.

5. The access point type communication device of claim 4, wherein:
the set of random access identifiers is a sequence of integers; and
the transceiver is configured to transmit to each client type communication device of the set of client type communication devices information about allocation of the plurality of random access resources to the set of client type communication devices based on the set of random access identifiers by transmitting a first element and a size of the sequence of integers or a number of random access identifiers assigned to a current random access frame.

6. The access point type communication device of claim 1, further comprising:
a transceiver configured to transmit to each client type communication device of the set of client type communication devices information about allocation of the plurality of random access resources to the set of client type communication devices based on the set of random access identifiers.

7. The access point type communication device of claim 6, wherein the transceiver is configured to transmit to each client type communication device of the set of client type communication devices the information about the allocation of the plurality of random access resources to the set of associated client type communication devices based on the set of random access identifiers as part of a trigger frame.

8. A client type communication device configured to communicate with an access point type communication device, the client type communication device comprising:
a transceiver configured to receive from the access point type communication device a random access identifier assigned to the client type communication device; and
a controller configured to determine on the basis of the random access identifier at least one random access resource of a plurality of random access resources for communicating with the access point type communication device, wherein the random access identifier is assigned to a respective association identifier of a set of association identifiers, and wherein the random access identifier is reassigned to a respective association identifier of the set of association identifiers in response to a change of an association state of at least one of client type communication devices of a set of client type communication devices.

9. A method of operating an access point type communication device configured to allocate a plurality of random access resources to a set of client type communication devices, the method comprising:
maintaining a set of association identifiers, wherein each identifier of the set of association identifiers is configured to identify a respective client type communication device of the set of client type communication devices, and a set of random access identifiers,
assigning each random access identifier of the set of random access identifiers to a respective association identifier of the set of association identifiers; and
reassigning at least some of the random access identifiers of the set of random access identifiers to a respective association identifier of the set of association identifiers in response to a change of an association state of at least one of the client type communication devices of the set of client type communication devices.

10. The method of claim 9, further comprising allocating the plurality of random access resources to the set of client type communication devices on the basis of the set of random access identifiers.

11. The method of claim 9, further comprising assigning each random access identifier of the set of random access identifiers to a respective association identifier of the set of association identifiers during an association session of the respective client type communication device.

12. The method of claim 9, further comprising transmitting to each client type communication device of the set of client type communication devices the respective random access identifier of the set of random access identifiers.

13. The method of claim 12, wherein the set of random access identifiers is a sequence of integers, the method further comprising transmitting to each client type communication device of the set of client type communication devices information about allocation of the plurality of random access resources to the set of client type communication devices based on the set of random access identifiers by transmitting a first element and a size of the sequence of integers or a number of random access identifiers assigned to a current random access frame.

14. The method of claim 9, further comprising transmitting to each client type communication device of the set of client type communication devices information about allocation of the plurality of random access resources to the set of client type communication devices based on the set of random access identifiers.

15. The method of claim 14, further comprising transmitting to each client type communication device of the set of client type communication devices information about allocation of the plurality of random access resources to the set of associated client type communication devices based on the set of random access identifiers as part of a trigger frame.

16. A method of operating a client type communication device configured to communicate with an access point type communication device, the method comprising:
  receiving from the access point type communication device a random access identifier assigned to the client type communication device; and
  determining on the basis of the random access identifier at least one random access resource of a plurality of random access resources for communicating with the access point type communication device, wherein the random access identifier is assigned to a respective association identifier of a set of association identifiers, and wherein the random access identifier is reassigned to a respective association identifier of the set of association identifiers in response to a change of an association state of at least one of client type communication devices of a set of client type communication devices.

* * * * *

UNITED STATES PATENT AND TRADEMARK OFFICE
CERTIFICATE OF CORRECTION

PATENT NO. : 10,827,531 B2
APPLICATION NO. : 16/125247
DATED : November 3, 2020
INVENTOR(S) : Genadiy Tsodik et al.

Page 1 of 1

It is certified that error appears in the above-identified patent and that said Letters Patent is hereby corrected as shown below:

In the Claims

In Claim 1, Column 11, Line 36, delete "charge" and insert --change--.

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*